Jan. 9, 1968         G. L. KAY         3,362,534

FUEL-WATER SEPARATION METHOD AND APPARATUS

Filed Jan. 20, 1966         3 Sheets-Sheet 1

GUENTER L. KAY
INVENTOR

BY
BUCKHORN, BLORE, KLARQUIST & SPARKMAN
ATTORNEYS

Jan. 9, 1968 G. L. KAY 3,362,534
FUEL-WATER SEPARATION METHOD AND APPARATUS
Filed Jan. 20, 1966 3 Sheets-Sheet 2

GUENTER L. KAY
INVENTOR
BY
BUCKHORN, BLORE, KLARQUIST & SPARKMAN
ATTORNEYS

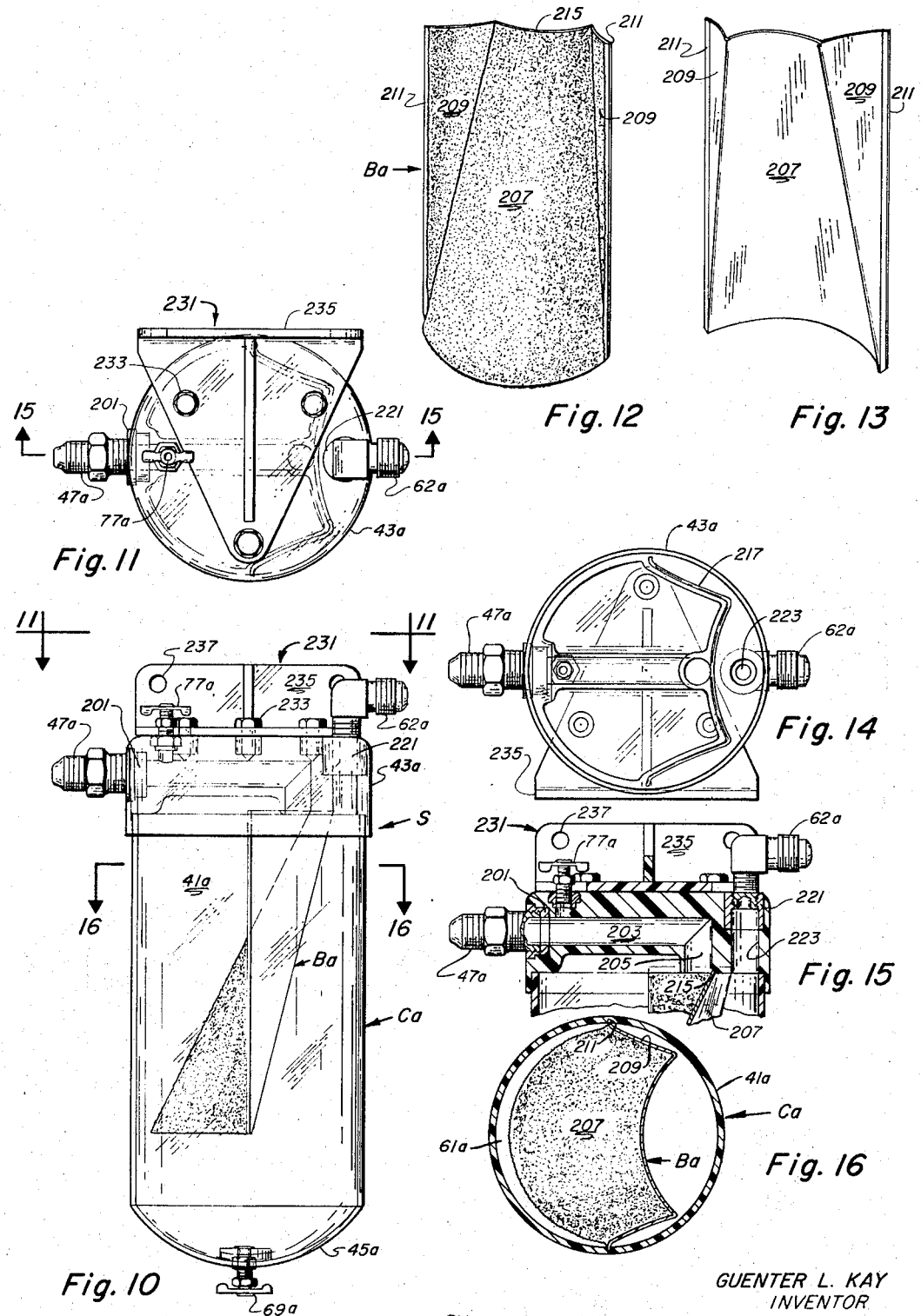

United States Patent Office 3,362,534
Patented Jan. 9, 1968

3,362,534
**FUEL-WATER SEPARATION METHOD
AND APPARATUS**
Guenter L. Kay, Portland, Oreg., assignor to Consolidated Metco, Inc., Portland, Oreg., a corporation of Delaware
Filed Jan. 20, 1966, Ser. No. 521,909
7 Claims. (Cl. 210—84)

ABSTRACT OF THE DISCLOSURE

The method of separating droplets of one liquid which are entrained in a matrix liquid which includes the step of directing the liquid against a separating member having a scabrous, and particularly sandblasted, surface. A fuel-water separator in which water is separated from fuel by being caused to coalesce by being brought into contact with a scabrous, and in particular, sandblasted, surface.

---

This invention relates to liquid separators, and particularly to liquid separators in which separation is effected by mechanical action, rather than chemical, electrical or other action. The invention has particular application to the mechanical separation of an entrained liquid, such as water, from another liquid, such as diesel fuel, wherein the entrained liquid is present in droplet form in the other liquid (hereinafter sometimes called the matrix liquid), and wherein there is a difference in the specific gravities of such liquids.

The term "droplet" will be used hereinafter to designate the entrained liquid in the various sizes it assumes at the time it enters the separator. The term "globule" will be used to designate the entrained liquid in the various sizes it assumes as the "droplets" are combined into larger size bodies of entrained liquid.

The presence of water in diesel fuel is a nagging problem to the diesel trucking industry, and while there are separators for the purpose of separating the water from the fuel, their efficiency is not good, and water left in the fuel causes operational and maintenance problems, particularly in cold weather, which problems are well known to those skilled in the art.

It is a main object of the present invention to provide a liquid separator which is more efficient than prior separators.

A further object of the invention is to prvide a method of separating liquids which is more efficient than prior methods.

I have discovered I can achieve a high degree of liquid separation by (1) flowing the liquids to be separated downwardly and in contact with an inclined roughened surface to cause a collecting and coalescing of the droplets of the entrained liquid into larger bodies or globules, (2) causing a reverse flow of the matrix liquid after the liquids have passed over the roughened surface to enable the globules (and probably some of the remaining droplets) of entrained liquid to gravitate and be thrown out from the matrix liquid, (3) proportioning the parts and controlling the liquid flow so that it is in nonturbulent laminar condition as it passes over the roughened surface, thereby to avoid sustaining the entrained condition of the unwanted liquid, and to avoid re-entraining globules which have been formed, whereby to facilitate the separation of the entrained liquid from the matrix liquid.

Another object of the invention is to provide a liquid separator having a baffle in the general shape of a segment of a cylinder specially arranged in cooperative relation to a cylindrical tank and in relation to an inlet and an outlet to achieve laminar flow of the liquid being separated to facilitate separation of it.

Other objects of the invention will be apparent from the following description taken in connection with the accompanying drawings wherein:

FIG. 10 is a view of a modified form of my separator showing the use of a transparent separator container;

FIG. 11 is a top view of the separator taken in the direction of the arrows 11—11 in FIG. 10;

FIG. 12 is a perspective view of the separator baffle employed in FIG. 10 from the operative side thereof;

FIG. 13 is a perspective view of such baffle showing the reverse side thereof;

FIG. 14 is a view of the underside of the container cap, with the separator baffle and container removed therefrom;

FIG. 15 is a midsectional view through the upper portion of the separator taken along line 15—15 of FIG. 11;

FIG. 16 is a horizontal sectional view taken along line 16—16 of FIG. 10.

Figure 1:
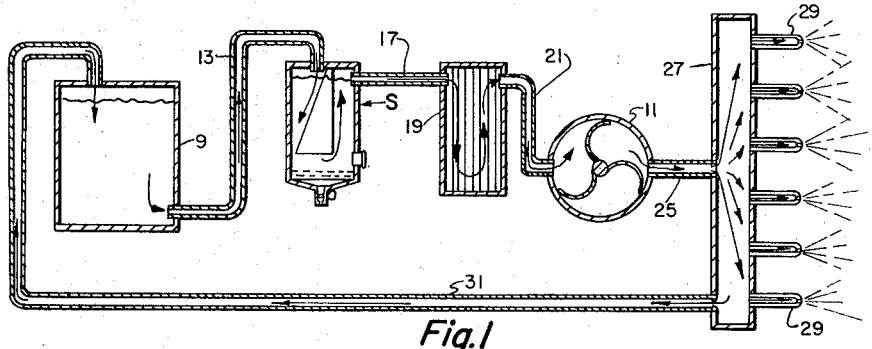
FIG. 1 is a diagrammatic sketch showing generally the fuel circuit of a diesel engine and showing a separator of the present invention incorporated therein.
Figure 2:
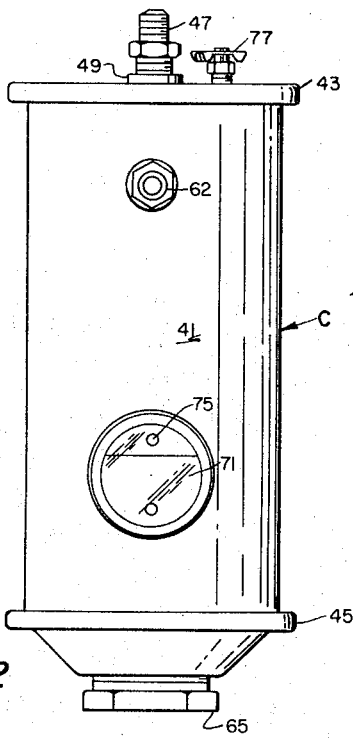
FIG. 2 is an elevational view of a separator of the present invention, taken on a larger scale than in FIG. 1.

Referring to the drawings, FIG. 1 shows only schematically a fuel circuit of a typical diesel engine. The circuit includes a fuel tank 9 from which fuel is drawn by a remotely located pump 11, the fuel passing through a line 13 to a separator S of the present invention, the fuel leaving the separator through a line 17 and passing through a filter 19. The fuel then passes through a line 21 leading to the pump 11 which forces the fuel through a line 25 to a manifold 27, the latter having a multiple outlets 29 and a return line 31. The latter is connected back to the tank 9.

FIGS. 2–5 show the separator S which in the specific embodiment shown includes a tank or container C having an upright cylindrical portion 41 sealingly closed at its upper end by a top cap 43 and its lower end by a bottom cap 45. The top cap has a fuel inlet in the form of a nipple 47 which is threadedly received by an interiorly threaded boss 49 of the cap. The fuel supply line 13 of FIG. 1 would be coupled to the nipple 47 by a conventional coupling, not shown.

Within the tank is a separator baffle B which is of curved form and as a matter of fact can be a tapered segment of a cylinder. The baffle is disposed so that the operative convex face 51 thereof is inclined to the vertical but is more upright than horizontal. Such face has a "positive" angle to the plane of the underside of the top cap 43, i.e., it forms an acute angle therewith.

The upper edge 53 of the baffle is sealingly secured to the underside of the cap 43, and the side edges 55 and 57

(FIG. 4) of the baffle conform to the curved interior surface of the container C and are sealingly secured thereto. The lower edge 59 of the baffle terminates short of the interior surface of the container C as is evident from FIGS. 3 and 4 to form a curved slot-like orifice 61 (FIG. 4) through which the fuel passes. The fuel is caused to undergo a reversal of flow at the lower edge 59 of the baffle and exits through an outlet nipple 62 which is disposed substantially above such lower edge.

The lower edge of the baffle B also terminates well above the bottom cap 45 to provide a sump 63 where water and other contaminants in the entering fuel can collect and eventually be discharged through a discharge opening provided centrally in the bottom cap 45. This opening is normally closed by a threaded clean-out plug 65. The collected water can optionally be released through a petcock 69 in the plug which is normally closed but can be opened to release the collected water. However, to effect a thorough cleaning out of solid contaminants collected in the container, the cleanout plug 65 should be removed.

A sight glass 71 is provided for the container C to enable the water level in the sump 63 to be checked occasionlly so that the sump water can be released before it reaches the level of the lower edge 59 of the baffle. The sight glass is sealingly secured in place in the container C and may have threads to fit female threads formed on a boss-forming ring or ferrule 73 permanently secured in a hole in the container. The glass may have spanner wrench holes 75 provides therein to enable it to be threaded into place.

A petcock 77 is provided on the top cap 43 to facilitate release of air during filling of the separator.

Figure 3:
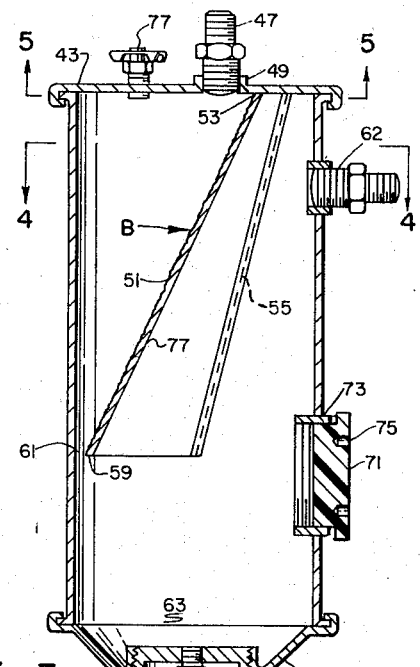
FIG. 3 is a vertical midsectional view of the separator of FIG. 2.
Figure 4:
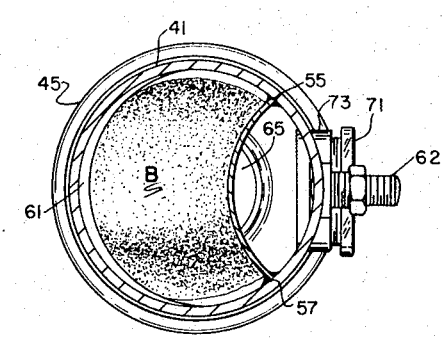
FIG. 4 is a horizontal sectional view taken along line 4—4 of FIG. 3.
Figure 5:
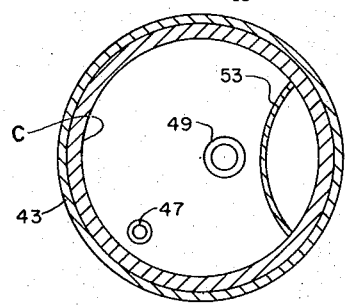
FIG. 5 is a horizontal sectional view taken along line 5—5 of FIG. 3.
Figure 6:
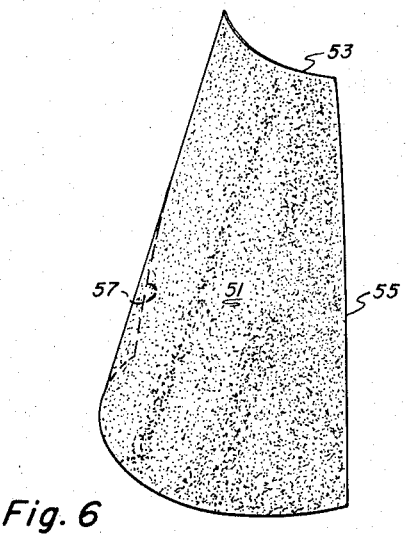
FIG. 6 is a perspective view of the separating baffle showing the convex side thereof.
Figure 7:
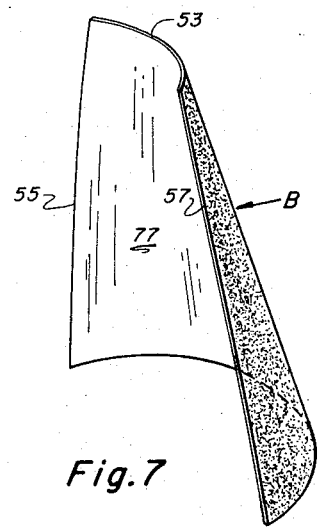
FIG. 7 is a perspective view of the separating baffle primarily showing the concave side thereof, but also showing a portion of the convex side.
Figure 8:
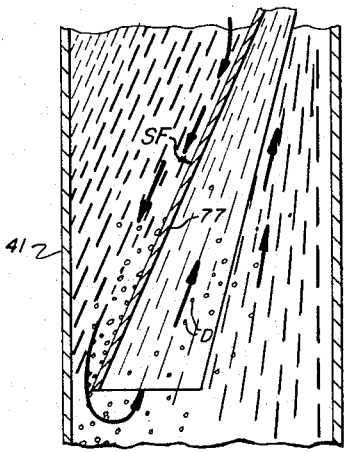
FIG. 8 is a simplified midsectional view through a separator of my general construction, but differing specifically in that the separating baffle has a smooth convex face to show that such face fails to cause any significant combining of the water droplets.

It is evident from FIG. 3 that the axis of the inlet nipple 47 is obliquely related to the baffle B and intersects the baffle at the upper portion thereof. It is important that the incoming liquid be directed against and in contact with the baffle B at the upper end thereof so that the fuel has full length contact with the baffle. To the extent this is not so, the separator is generally proportionally less efficient.

The disposition of the inlet can vary somewhat from that shown. For instance, the inlet could be disposed substantially parallel to the length of the baffle but in such case it would have to be disposed in closely adjacent (substantially contiguous) relation to the baffle to achieve maximum efficiency. Thus the angle between the inlet axis and the face 51 can vary from 0° (parallel to the face 51) to somewhat less than 90° but preferably not greater than 60°.

Of course, in the above discussion, it is the angle of the incoming fuel relative to the baffle that is important. Therefore, the axis of the actual inlet could be at a different angle than above described, and such angle can be effectively changed by suitable inlet baffles to direct fuel onto the separator baffle B at its upper end. In such case, the effective inlet axis would be within the above limits while the actual inlet axis would not.

While only one separator baffle B is shown in FIG. 3, several could be provided, and while baffle B is shown as being curved and specifically as a segment of a cylinder, it and the container could have other shapes without departing from the scope of the present invention.

Of critical importance to the present invention however, is the provision of a roughened or scabrous surface on the operative face 51 of the separator baffle B. I have found that such a surface can be provided by a sand blasting operation to leave a roughened or scabrous surface of at least 100 RMS (microinches) and not over 180 RMS or the efficiency of separation drops off substantially. The above values on the SAE roughness height value scale (in microinches) would be approximately 90 mu in (aa) to 160 mu in (aa) but the SAE scale has no 90 value but only an 80 or a 100 value.

It may be more convenient from the manufacturing standpoint to sandblast the entire baffle including the rear face 77 thereof. This would not interfere with or aid the separating step.

Operation

Figure 9:
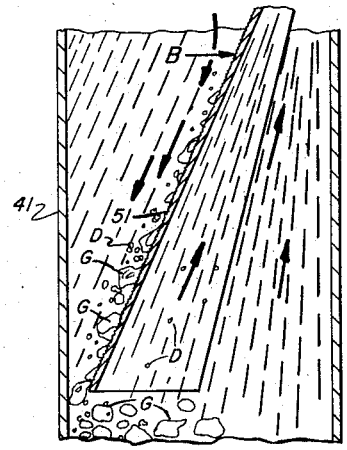
FIG. 9 is a simplified midsectional view through my separator showing that a roughened convex face on the baffle will cause substantial combining of the droplets into globules.

Referring particularly to FIGS. 3 and 9, the incoming fuel (contaminated by water and possibly solid foreign particles) is directed by the inlet nozzle 47 onto the upper end of separator baffle B and passes down the length of the convex operative face 51 of the baffle and thus travels across the "tooth" of the roughened or scabrous surface of such face. Droplets D of water gravitate toward and are carried against such roughened surface, and this action breaks down the surface tension of the droplets so that they tend to spread out and cling to such surface and shortly merge and combine with other droplets (which are similarly affected) to form globules G of water. The globules under the influence of gravity and the force of contact therewith of the downwardly flowing fuel are carried downwardly along the roughened face and grow in size by picking up other droplets whose surface tension has been broken.

As the globules G pass through the orifice 61, the heavier specific gravity of such globules and the downward motion imparted thereto urge them to continue to move toward the sump 63, and these forces prevail over that of the entraining effect of fuel, which fuel is caused to reverse its flow and travel upwardly toward the outlet nipple 62. Thus the globules collect in the sump 63 and form a body of water and solid particled contaminants which can be discharged at will.

It should be pointed out that the velocity of the fuel substantially decreases as the fuel leaves the curved orifice 61 because the chamber beneath the orifice provides a passageway having a cross section at least several times greater than that of the orifice 61. This decrease in velocity provides a sort of quiescent liquid zone to enable the globules to more readily gravitate toward the sump 63 than were the velocity higher.

It should also be pointed out that I have discovered that the efficiency of the separator shown in FIGS. 2–9 is affected by the spacing of the lower baffle edge 59 from the container C. For instance, in one form of my separator, the optimum efficiency of the separator was obtained with a gap of five-sixteenths of an inch (at the place of maximum gap width) but fell off when the gap was narrowed to one-quarter of an inch, and also fell off when the gap was increased to three-eighths of an inch.

It is evident therefore that in manufacturing a separator of my invention, the gap width should be varied to determine the position of optimum efficiency. It is obvious that the above specific inch dimensions apply to the particular dimensions of the separator in question, and that the optimum spacing of the separator baffles of separators of other dimensions will be different.

Modified form of invention

FIGS. 10–16 show a modified form of my separator which includes a container Ca having a transparent cylindrical portion 41a and an integral bottom closure member 45a, also of transparent material (such as for instance a clear plastic). There is a top cap 43a molded of transparent or at least translucent material which fits over and is secured to the upper end of the cylindrical portion 41a.

The separator has an inlet nipple 47a threaded into an internally threaded insert 201, the nipple passage communicating with a fluid passage 203 formed in the cap. The passage 203 terminates in a downwardly directed passage leg 205 which may be considered as the inlet for the separator.

Below the cap 43a is a baffle Ba which has a central portion 207 (FIGS. 10, 12 and 16) shaped like the baffle B. The central portion however has wing portions 209 projecting away from the convex operative side of the baffle and terminating in outwardly bent margins or flanges 211. These margins fit in straight grooves formed in the interior surface of the cylindrical portion 41a of the separator Ca and are sealingly secured in place by a suitable adhesive material. The wings 209 taper in width from the upper end to the lower end of the baffle B as is evident from FIGS. 12 and 13.

The upper end 215 of the baffle Ba fits in a W-shaped groove 217 (FIG. 14) formed in the top cap 43a and is sealingly secured in place by a suitable adhesive material.

An outlet nipple 62a is threaded into an internally threaded insert 221, the nipple passage being in communication with an outlet passage 223 in the top cap 43a. A petcock 77a is provided in the top cap 43a and communicates with the passage 203 and a petcock 69a is mounted in the bottom closure member 45a. The functions of these petcocks are obvious from the previous discussion, but it should be pointed out that the upper petcock should be opened when the lower petcock is opened to facilitate the ready discharge of water from the separator container.

A hanger bracket 231 is secured by bolts 233 to the top cap 43a and provides an upstanding plate portion 235 formed with bolt holes 237 to facilitate mounting the separator S in place on or near a diesel engine which is supplied with fuel from the separator.

The operation of the form of the invention shown in FIGS. 10–16 is the same as for the first described form of the invention.

My separator has a much higher efficiency than separators of which I am aware, having an efficiency range between 95 and 99%.

It will be appreciated that the details of construction of my separator may be altered within the broad concepts set forth, but the roughened or scabrous surface, direction of flow, and laminar flow are critical. More baffles may be provided if desired and the baffles and the container may be of other shapes and forms.

The use of "droplet" and "globule" in the foregoing description may need further clarification. It is recognized that the range of sizes of "droplets" of the entrained liquid may overlap the range of sizes of "globules" of such liquid, but the general meaning and relationship intended is evident and furnishes a clearer explanation of the operation of my separator than would be the case if possibly more accurate but certainly more clumsy general terminology were employed for "globules" such as "large drops," "massive drops," "masses of entrained liquid," etc.

It should be further mentioned that in fact there may be differences of opinion as to relative sizes of "drops," "droplets," "globules" and "globulets." However, since "globulets" is the diminutive of "globules," and "droplets" the diminutive of "drops," even if "drops" and "globules" might be considered by some as being of the same relative size, it would nevertheless follow that "globules" would normally be larger than "droplets," particularly if the meaning of "globules" insofar as size is concerned is taken to be like that in the phrase "globules of fat in the soup."

The term scabrous as used herein and in the claims means a surface having small raised dots or points substantially uniformly distributed.

While the invention has been described in connection with the separation of water from diesel fuel, it is evident that the separator can be employed to separate other liquids which are immiscible in one another and can be employed to separate one or more entrained liquids from one or more matrix liquids.

Having described the invention in what is considered to be the preferred embodiment thereof, it is desired that it be understood that the invention is not to be limited other than by the provisions of the following claims.

I claim:

1. The method of separating one liquid from another liquid wherein said one liquid is immiscible in said another liquid and present therein in droplet form, and wherein the specific gravity of said one liquid is greater than that of said another liquid,
   said method comprising providing a mixture of said liquids,
   flowing said mixture in a predetermined direction under laminar flow conditions against a sandblasted surface having a roughness of 100 to 180 RMS to break the surface tension of many of said droplets,
   bringing the just mentioned droplets together to effect a combining thereof into collections of said one liquid,
   then causing a change in the direction of flow of said another liquid so that the momentum of said collections tends to cause them to continue to move in said predetermined direction whereby to effect separation thereof from said another liquid.

2. A liquid separator for separating one liquid from at least one other liquid wherein said one liquid is immiscible in said other liquid but entrained therein in fine droplet form and wherein the specific gravity of said one liquid is greater than that of said other liquid,
   said separator including a member having a sandblasted surface having a roughness between 100 and 180 RMS,
   means for directing a mixture of said liquids over said sandblasted surface and in contact therewith whereby to break the surface tensions of certain droplets and cause a coalescing thereof into globules,
   and means for separating said globules from said other liquid.

3. A liquid separator for separating one liquid from at least one other liquid wherein said one liquid is immiscible in said other liquid but entrained therein in fine droplet form and wherein the specific gravity of said one liquid is greater than that of said other liquid,
   said separator comprising a container,
   an upright baffle in said container having an upper end and a lower end,
   said baffle adapted to have the liquids to be separated pass from the upper end of the baffle next to one face or side thereof toward and around the lower end of said baffle and thence back upwardly toward said upper end,
   said container providing a sump below the lower end of said baffle into which separated liquid may collect,
   inlet means at said one end of said baffle disposed in a manner to direct incoming liquids onto said one face of said baffle,
   outlet means on the opposite side of said baffle from said inlet means and disposed at a level above that of the lower end of said baffile,
   said one face of said baffle having a sandblasted surface having a roughness between 100 and 180 RMS so as to break the surface tension of the droplets of said one liquid carried thereagainst and hence cause combining and uniting thereof into globules which are urged under the force of gravity to travel into said sump and urged by centrifugal force to be thrown into said sump as the flow of said another liquid is reversed at the lower end of said baffle.

4. A fuel-water separator comprising an upright cylindrical tank,
   a baffle in said tank,
   said baffle constituting at least in part a sector of a hollow cylinder,
   said baffle sector having a radius approximately equal to that of the tank,
   said sector having generally parallel opposed convex and concave faces,
   said sector being arranged in inclined relation with respect to said tank and forming a smaller acute angle with the vertical than with the horizontal so that it is generally upright in said tank, said sector being wider at its lower end than at its upper end and extending from the top of the tank downwardly but terminating short of the bottom of said tank, said baffle spanning the interior of said tank in a widthwise direction, said sector being arranged within said tank so that the lower edge of the sector and the opposed surface of the tank define a generally crescent-shaped opening for the passage downward therethrough of the liquid being handled, said sector extending across the center line of said tank so that with respect to a vertical plane passing through the axis of the tank and symmetrically disposed relative to the baffle, at least a major portion of the lower edge of said sector lies on one side of said plane, and at least the major portion of the top edge of said sector lies on the other side of said plane, said tank having an inlet opening in the upper end thereof of the convex side of said baffle for directing a fuel-water mixture onto said baffle, said inlet opening being directed generally downwardly and being located adjacent the upper end of said baffle, said tank having a fuel outlet opening therein at the upper end of the tank on the concave side of said sector, and means at the lower portion of said tank for discharging accumulated water from the tank.

5. A fuel-water separator as set forth in claim 4, wherein the convex surface of said tank is scabrous.

6. A fuel-water separator as set forth in claim 4, wherein said baffle has wing portions extending away from the side edges of said sector and disposed in sealed contact with the interior of said tank.

7. A fuel-water separator for separating water droplets from diesel fuel oil, said separator including a tank, a separating member in said tank angularly related to the horizontal and having an upper end and a lower end and having a sandblasted surface having a roughness of between 100 and 180 RMS for causing coalescing of the droplets of water in a diesel fuel oil-water mixture coming in contact with said sandblasted surface, said tank having an inlet for directing a mixture of diesel fuel oil and water onto said sandblasted surface at the upper portion thereof, said tank having a sump in the lower portion in which coalesced water can collect, said tank having a water outlet in the lower portion thereof by which the collected water may be discharged, said tank having a fuel outlet at the upper portion thereof for discharging fuel from said tank, said outlet being disposed on the opposite side of said separator member from that on which said inlet is located.

References Cited

UNITED STATES PATENTS

| | | | |
|---|---|---|---|
| 2,214,248 | 9/1940 | Hawley | 210—532 |
| 2,326,691 | 8/1943 | Schum | 210—306 |
| 2,908,393 | 10/1959 | Lanphier | 210—23 X |

SAMIH N. ZAHARNA, *Primary Examiner.*

REUBEN FRIEDMAN, *Examiner.*

J. L. DeCESARE, *Assistant Examiner.*